June 3, 1958
A. W. SIMPSON
2,837,668
MECHANICAL SYSTEMS
Filed July 20, 1955
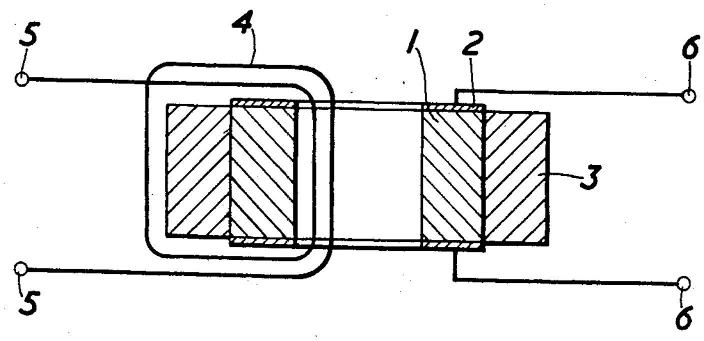
INVENTOR
ANTHONY W. SIMPSON
BY Greene, Pineles and Durr
ATTORNEY 2,837,668

MECHANICAL SYSTEMS

Anthony W. Simpson, Radcliffe-on-Trent, England, assignor to The Plessey Company Limited, Ilford, England, a British company Application July 20, 1955, Serial No. 523,344

6 Claims. (Cl. 310—26)

This invention relates to electro-mechanical systems.

From time to time the need arises for a device in which impedance conversion can be obtained. For example, it may be desired to convert a varying or alternating potential from a low impedance source to present high impedance to the circuit output, in circumstances where a voltage transformer is not suitable for example, at very low frequencies. The present invention is concerned with a device for this purpose.

In accordance with the present invention there is provided an electrical impedance converting device comprising a magnetostrictive element mechanically coupled to a piezoelectric or electrostrictive element.

The invention also includes an electrical impedance converting device comprising a magnetostrictive element, an input coil associated with said element, a piezoelectric or electrostrictive element associated with said magnetostrictive element and electrodes on said piezoelectric or electrostrictive element, whereby a current in said coil causes said magnetostrictive element to strain said piezoelectric or electrostrictive element and thereby to produce a voltage on said electrodes, or to effect a change of capacitance between them.

Further features and advantages of the invention will appear from the following description of one embodiment thereof given by way of example, in conjunction with the accompanying drawing, which is a partly diagrammatic cross-section through the impedance converting device.

In the embodiment of the invention shown as electrostrictive, and in this case piezoelectric, element 1 consists of an annulus of a titanate material such as barium titanate or a mixture of barium titanate with suitable additives, for example, lead titanate, which in known manner is permanently polarised by the application to it of a strong electrostatic field. Electrodes 2 are provided on opposed surfaces of the annulus.

Closely surrounding the piezoelectric annulus is a second annulus 3 of magnetostrictive material such as a suitable ferrite, and magnetostriction is induced in the ferrite by means of an energising coil 4 wound toroidally over the two annuli; the coil 4 is shown only diagrammatically. Coil 4 is connected to input terminals 5 and electrodes 2 to output terminals 6. In response to a current passed through the coil 4 the outer annulus 3 can be made to constrict the inner annulus and thereby cause a voltage to appear piezoelectrically on the electrodes 2. The coil can be wound to present a very low input impedance, so that the input impedance, looking into terminals 5 is correspondingly low. On the other hand the impedance due to the piezoelectric element is extremely high and the output impedance at terminals 6 is correspondingly high. The device has the important advantage of being able to operate down to almost zero frequency.

If the output voltage is to correspond to the input current, it is necessary to avoid the frequency-doubling effect which will normally appear with the two elements. The magnostrictive ferrite can be permanently magnetically polarised by a permanent magnet or by a direct current applied to a coil, which may be the input coil 4, associated with the annulus; alternatively use can be made of a ferrite material which has a sufficiently high remanence to provide its own magnetic polarisation. If a piezoelectric material is used for element 1 the frequency-doubling effect will not appear. If frequency-doubling can be tolerated an electrostrictive materal can be used for element 1. In this event there will be no voltage produced directly on electrodes 2, but a change of capacitance between them, and if an output in terms of voltage is required external means must be provided for this purpose. The output obtained, in either case, is dependent upon the shape and disposition of the electrodes, as well as upon the nature and shape of the elements used.

Moreover, different arrangements of the elements 1 and 3 can be adopted, and we have found it practicable to place the output element inside, outside or by the side of the input element.

I claim:

1. An electrical impedance converting device comprising a first annulus of crystalline insulating material of the type which is adapted to change its shape on the application of a voltage thereto and a second annulus consisting of magnetostrictive ferrite material, the inside periphery of one of said annuli being in contact with the outside periphery of the other, a pair of electrodes, one at each end of said first annulus, a coil wound toroidally about both said annuli.

2. An electrical impedance converting device as claimed in claim 1 wherein the second annulus is positioned on the outside of the first annulus.

3. An electrical impedance converting device as claimed in claim 1 wherein the second annulus is a permanently magnetized member.

4. An electrical impedance converting device as claimed in claim 1 wherein polarization of the second annulus is produced electromagnetically by means of said toroidally wound coil.

5. An electrical impedance converting device as claimed in claim 1 wherein said first annulus consists essentially of a piezoelectric material.

6. An electrical impedance converting device as claimed in claim 1 wherein said first annulus consists essentially of an electrostrictive material.

References Cited in the file of this patent

UNITED STATES PATENTS

| | | |
|---|---|---|
| 2,224,891 | Wright | Dec. 17, 1940 |
| 2,452,530 | Snoek | Oct. 26, 1948 |
| 2,579,978 | Snoek et al. | Dec. 25, 1951 |
| 2,610,583 | Miller | Sept. 16, 1952 |
| 2,659,869 | Allison | Nov. 17, 1953 |
| 2,683,856 | Kornei | July 13, 1954 |